Nov. 22, 1949          A. GIRZ          2,488,814
EXPANSIBLE BROACH
Filed July 6, 1946
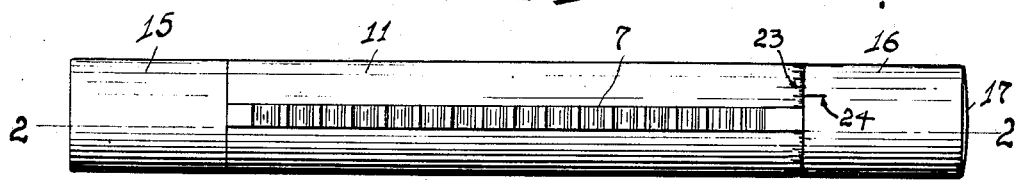
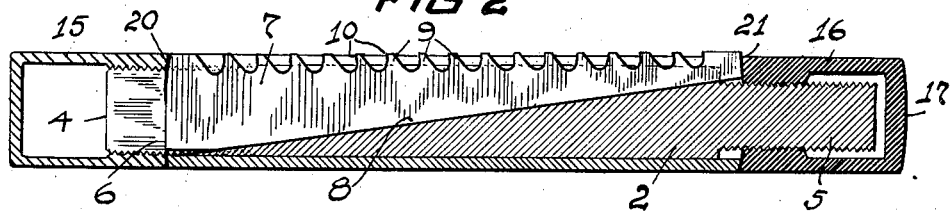
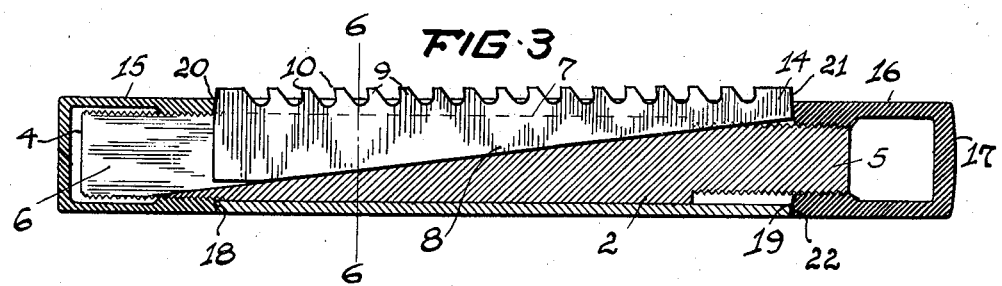
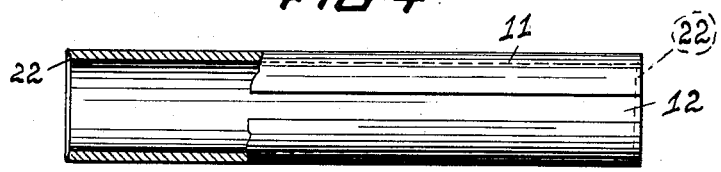
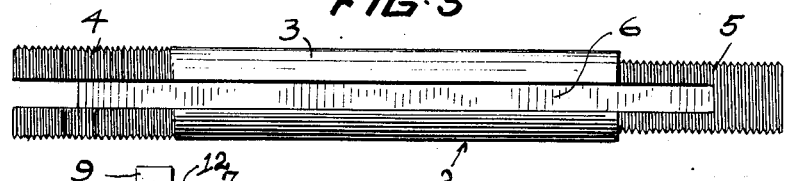
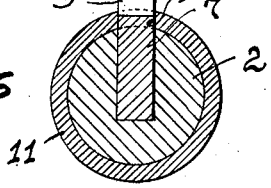
INVENTOR.
ADOLPH GIRZ
BY
ATT.

Patented Nov. 22, 1949

2,488,814

UNITED STATES PATENT OFFICE 2,488,814

EXPANSIBLE BROACH

Adolph Girz, Cleveland, Ohio, assignor, by mesne assignments, to Nellie M. Gottschalt, Euclid, Ohio Application July 6, 1946, Serial No. 681,632

1 Claim. (Cl. 29—95.1)

This invention relates in general to expansible broaches and, more particularly, to expansible broaches constructed to center themselves with respect to the work piece to be broached and to adjust their cutting blades to different cutting depths without removal of the blades, all as shown in Patent No. 2,184,383, dated December 26, 1939, which discloses a broach with a cutting blade adjustably supported in a broach body. This cutting blade, which includes a longitudinally inclined base portion, is extended into a longitudinally inclined slot of the broach body and held in desired position by a split sleeve follower member sleeved upon the broach body so that the cutting edge of the blade extends through the slit, and clamping nut members threadedly engaged with opposite ends of the broach body and in clamping engagement with the opposite ends of the cutting blade and the sleeve follower member.

Broaches of the type described have the slots in their broach body inclined to transfer substantially all broaching forces directly from the clamping nut members to the ends of their cutting blades and therefore effect excessive localized pressure between cutting blades and clamping nut members and undesired wear and tear on these members and the cutting blades.

The primary object of the present invention is the provision of an improved broach of the type referred to above constructed to transfer substantially all broaching forces from the respective nut member to the broach body and hence to the cutting blade to eliminate excessive localized pressures between the cutting blade of the broach and the respective clamping nut member and thus increase efficiency and life of the broach.

This object of the invention is attained by providing a broach of the type referred to with a broach body which is slotted at an inclination to acute angularly intersect the axis of the broach body so as to transfer broaching forces by frictional contact from the broach body to the cutting blade and avoid direct transfer of broaching forces from the nut member to the cutting blade.

Another object of the invention therefore is the provision of an improved broach of the type referred to above, in which the cutting blade supporting slot of the broach body is inclined to acute angularly intersect the axis of the broach body so as to transfer broaching forces to the locking of the cutting blade by frictional contact between cutting blade and broach body.

A thus constructed broach, which is self-centering, can readily be forced through a hole in a work piece when the broaching forces are applied to the clamping nut member at the head of the broach, as any excessive pressures between the head nut member and the cutting blade are eliminated, and this type of broaching operations is substantially improved when the broaching forces are applied axially with respect to the head nut member.

A further object of the invention therefore is to provide a broach of the type referred to above, having a broach body with cutting blade supporting slot acute angularly related to the broach body and a head nut member shaped with a spherical end portion for axial loading of the head clamping nut member.

Additional objects and novel features of construction, combination and relations of parts by which the objects in view have been attained, will appear and are set forth in detail in the course of the following specification. The drawing accompanying and forming part of the specification illustrates a practical embodiment of the invention, but it will be apparent as the specification proceeds that the structure of the invention may be modified and changed in various ways without departure from the true spirit and scope of the invention.

In the drawing:

Fig. 1 is a plan view of the improved expansible broach.

Fig. 2 is a sectional view through the broach shown in Fig. 1, the section being taken on line 2—2 of Fig. 1.

Fig. 3 is a view similar to Fig. 1, with the cutting blade adjusted to another position.

Fig. 4 is a plan view, partly in section, of the split sleeve follower member.

Fig. 5 is a plan view of the broach body; and

Fig. 6 a cross sectional view on line 6—6 of Fig. 3.

Referring now in detail to the exemplified form of the invention shown in the drawing, reference numeral 2 denotes a cylindrical broach body embodying a smoothly finished central portion 3, and threaded foot and head portions 4 and 5 respectively, head portion 5 being smaller in cross section than foot portion 4 for a purpose later to be described.

Broach body 2 is provided with a longitudinally inclined slot 6, with an inclination sloping toward the foot portion 4, so that slot 6 intersects the longitudinal axis of broach body 2 at an acute angle. Slot 6 longitudinally slidably mounts a cutting blade 7, the rear portion 8 of which is inclined so as to effect parallel lateral shifting of blade 7 when shifted longitudinally in said slot. The cutting blade 7 includes cutting teeth 9, the cutting edges 10 of which face toward the foot portion of broach body 2, and the sides of cutting blade 7 engage a split sleeve follower member 11 which is sleeved upon the central portion of the broach body. Cutting blade 7 extends partly through slit 12 of follower member 11, which slit fits the blade to additionally support the blade by follower member 11, an arrangement particularly necessary when cutting blade 7 is in the position shown in Fig. 3, in which end portion 14 of blade 7 is not held in slot 6. The threaded foot and head portions 4 and 5 carry clamping nut members 15 and 16, head clamping nut member 16 being heavier constructed to more readily withstand broaching forces applied to the spherical end portion 17 of head clamping nut member 16 to axially load such member and thus avoid undesirable stresses in the broach.

The clamping faces 18, 19 of nut members 15 and 16, the end faces 20, 21 of the blade 7 and the end faces 22 of the follower member are slightly angularly related to the axis of the broach body to forcibly seat the blade in slot 6 of broach body 2 and effect tight engagement of follower member 11 with broach body 2 and the sides of blade 7 when the nut members are in proper clamping position.

Preferably, as shown in Fig. 1, there is provided a scale 23 on follower sleeve member 11, which scale cooperates with a mark 24 on head clamping nut member 16 to permit fine and extremely accurate adjustments of the setting of the broach.

Having thus described my invention, what I claim is:

An expansible broach, including a solid elongated broach body, a longitudinal blade-receiving slot in said body, said slot having a uniformly inclined bottom surface whereby said slot varies uniformly in depth from one end to the other end, a blade seated in said slot, one longitudinal edge of said blade having cutting teeth thereon, the opposite longitudinal edge of said cutting blade being inclined with respect to said first longitudinal edge and in continuous engagement with said inclined bottom surface whereby longitudinal movement of the blade in the slot will cause inward or outward movement of the blade, said cutting teeth having cutting edges facing in the direction of the maximum depth of said slot and said blade, whereby a portion of the cutting load is transmitted directly through the blade to said elongated broach body, and means for retaining and longitudinally shifting the blade in said slot.

ADOLPH GIRZ.

REFERENCES CITED

The following references are of record in the file of this patent:

UNITED STATES PATENTS

| Number | Name | Date |
|---|---|---|
| 2,184,383 | Glenny | Dec. 26, 1939 |